United States Patent [19]

Ryu

[11] Patent Number: 5,094,434

[45] Date of Patent: Mar. 10, 1992

[54] SUPPORT SPRING FOR A TAPE CASSETTE

[75] Inventor: Su S. Ryu, Chungnam, Rep. of Korea

[73] Assignee: SKC Limited, Kyungki, Rep. of Korea

[21] Appl. No.: 582,234

[22] Filed: Sep. 14, 1990

[30] Foreign Application Priority Data

Sep. 16, 1989 [KR] Rep. of Korea .................... 89-13601

[51] Int. Cl.$^5$ ................................................ F16F 1/18
[52] U.S. Cl. .................................... 267/158; 242/198; 242/199; 360/130.33; 360/132
[58] Field of Search ................ 267/47, 148, 149, 158, 267/163, 160, 181; 242/198, 199; 360/130.33, 132, 134

[56] References Cited

U.S. PATENT DOCUMENTS 4,662,579 5/1987 Gelardi et al. ...................... 242/199
4,736,903 4/1988 Landry et al. ...................... 242/198
4,899,243 2/1990 Bordignon .......................... 360/132

FOREIGN PATENT DOCUMENTS 0107448 7/1982 Japan ................................... 267/158

Primary Examiner—Robert J. Oberleitner
Assistant Examiner—Christopher Schwartz
Attorney, Agent, or Firm—Ladas & Parry

[57] ABSTRACT

The present invention provides a support spring which may be used in connection with cassettes, and particularly video cassettes. The support spring has a central portion which is adapted to be fixed to an inside surface of the upper portion of a cassette. The spring also includes a supplementary piece joining the central portion with a pressing part and a bending part which also joins the central part with the pressing part, the bending part being shorter than the supplementary piece.

16 Claims, 4 Drawing Sheets

SUPPORT SPRING FOR A TAPE CASSETTE

FIELD OF THE INVENTION

The present invention relates to a support spring which elastically presses the reels provided within a video tape cassette housing to keep the wheels disposed therein from swinging off their axes.

BACKGROUND OF THE INVENTION

Generally, a video tape cassette has a housing made up of upper and lower body portions, and a supply reel and a take up reel are provided within the housing. Video tape is wound on the reels and runs under the protection of both reels. In order to improve the stability of the wheels when rotating, they are urged toward the lower part of the cassette housing by a support spring installed on the inner surface of the upper portion of the cassette housing.

In forming such a support spring, a thin metallic plate made of stainless steel has been used in the past. As illustrated in FIGS. 8A and 8B, bending parts 21, 21' are formed in the thin metallic plate to provide an elastic urging force and elastic pieces 22, 22' may be formed on the bending parts 21, 21'.

In the case the design of FIG. 8A, in forming the aforesaid support spring 20, the elasticity to be obtained therefrom is dependent only on the bending parts 21, 21' and thus the design tends to be too stiff. In the case of the design of FIG. 8B it has a problem in that while elasticity is improved by partially cutting off the bending parts 21, 21', it is difficult to maintain a given elasticity effectively for a long time.

The aforesaid two support springs also increase cassette production costs by using relatively expensive stainless steel and by increasing the manufacturing processing required by adding a pressing step to form the bending parts 21, 21'.

Recognizing that such metallic support springs are uneconomical and impractical, the present invention aims to reduce the manufacturing processes and production costs by providing a support spring made with relatively inexpensive synthetic resin and to improve its function by providing good elasticity.

SUMMARY OF THE INVENTION

The present invention provides a support spring which unites working of the elasticity of a bending part with the elasticity of a supplementary elastic piece. As indicated above, the support spring keeps the cassettes reels from swinging by being installed inside the upper half of usual video tape cassette housing. The support spring has a generally planar central portion and a pair of pressing parts disposed outwardly from said central part. An elastic element couples the pair of pressing parts with the central portion, the elastic element including the aforementioned supplementary elastic piece and bending part which join each of the pressing parts at common junction line and which meet a plane occupied by the central portion at different junctions spaced different distances from a common reference point on the central portion.

The support spring preferably includes holes on the central portion which are adapted to be united with projections on the upper half of the cassette housing.

Embodiments of the present invention will now be described with reference to the drawings attached hereto.

DETAILED DESCRIPTION OF THE PREFERRED EMBODIMENT OF THE INVENTION

Figure 5:
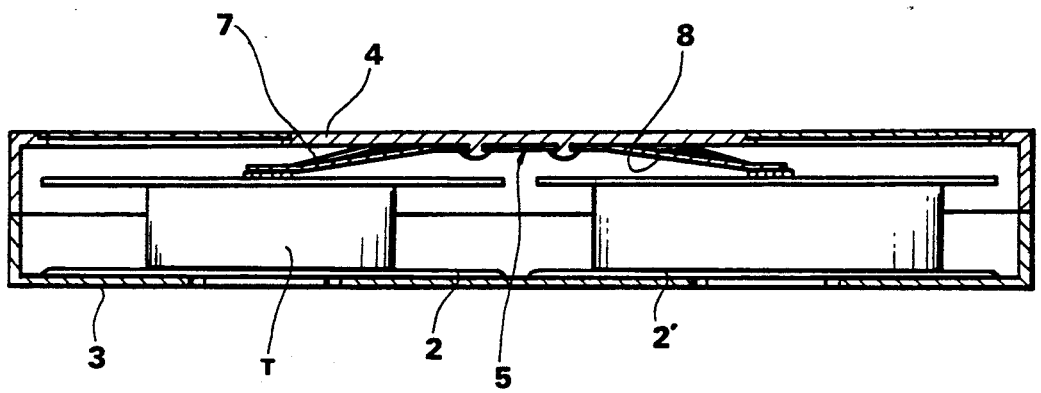
FIG. 5 is a vertical sectional view the video tape cassette, as assembled, illustrating how the present invention may be used.

A support spring 5 is used in a video cassette housing to keep reels 2, 2' from swinging in use. The spring 5 is installed on the inner upper surface of the upper half 4 of video tape cassette housing 1. Reels 2, 2', which have a tape T wound thereon, are seated on the inner surface of the lower half 3 of the housing. The support spring 5 is attached to the inner surface of the upper half 4 and urges the reel 2, 2' downwardly when the upper and lower halves of the cassette are brought together as shown in FIG. 5. When the upper half is fixed to the lower half as illustrated in FIG. 5, in such a united condition, the end 9 of the bending part of support spring presses the reels and elastic force provided by spring 5 is strengthened by the united working of the elasticity of bending part 7 itself and the elasticity of a supplementary elastic piece 8.

Figure 1:
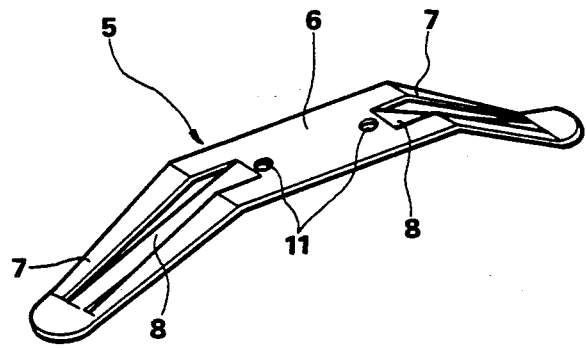
FIG. 1 is a perspective view of the support spring embodied by the present invention.
Figure 2:
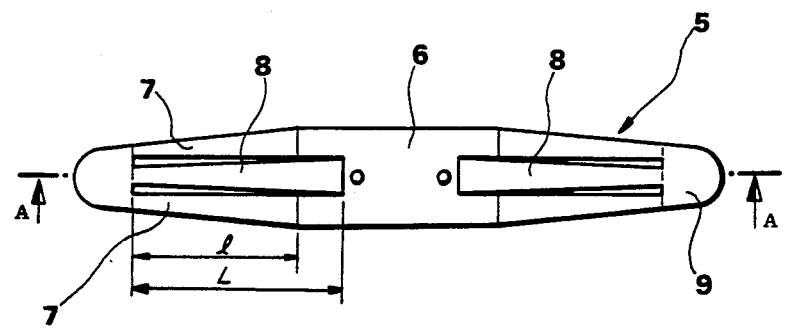
FIG. 2 is a plan view of the support spring embodying the present invention.
Figure 3:
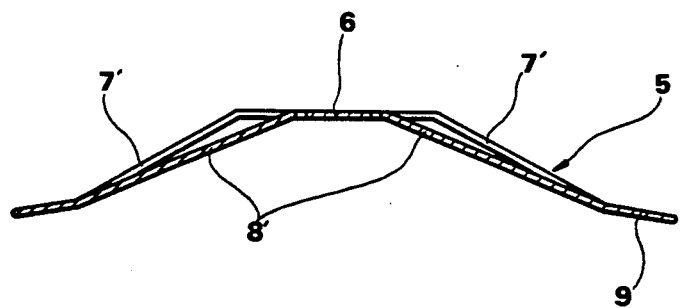
FIG. 3 is a cross-sectional view taken along the A—A line of FIG. 2.
Figure 4:
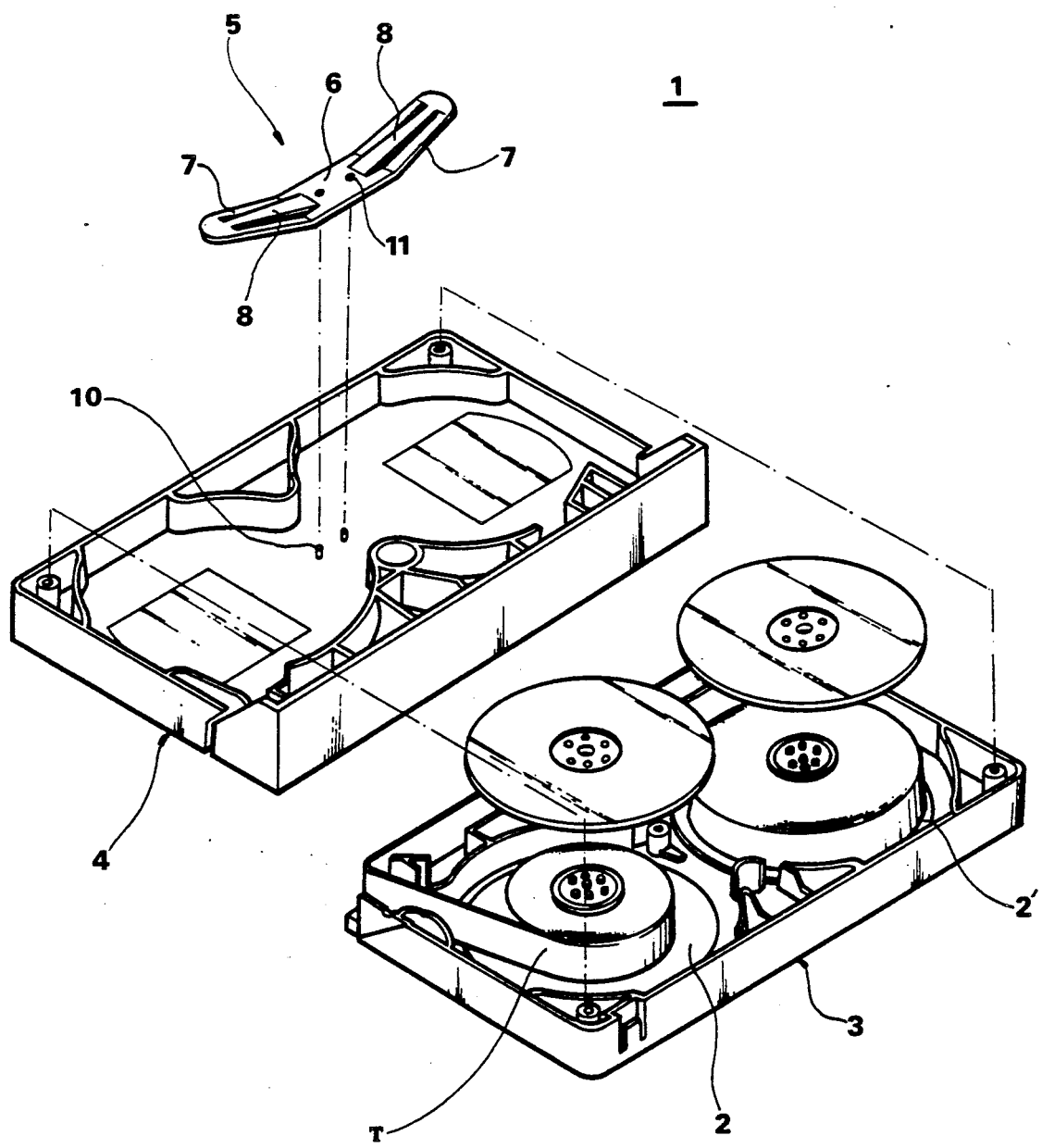
FIG. 4 is a disassembled perspective view of a video tape cassette wherein the present invention is used.

Support spring 5, which is molded by injecting synthetic resin, includes supplementary elastic piece 8, which is formed lengthwise and in the center of bending part 7 in this embodiment. As can be best seen in FIGS. 1, 2 and 3, bending part 7 has a length "l" and is disposed at a certain angle on both sides of the central portion, upper surface 6 of support spring 5. The supplementary elastic piece 8 is separated lengthwise from the bending part 7 and at its lower end both are joined to a pressing part 9 formed on both ends of spring 5. Supplementary piece 8 has a length "L" and is disposed in a downwardly slantwise arrangement toward pressing part 9 from upper surface 6. The bending part 7 is connected to upper surface 6 at a position which is located outwardly compared to the point of connection between upper surface 6 and supplementary elastic piece 8. As can be seen in the Figures, the length "l" of bending part 7 is smaller than the length "L" of supplementary elastic piece 8.

In use, the bending part 7 is put into compression when pressing parts 9 engage the reels 2, 2' because the upper surface 6 of support spring 5 has already made contact with the inner surface of upper half 4 of the cassette housing. Bending part 7 displays its elasticity, producing some compressive stress. At the same time, the supplementary elastic piece 8 produces elasticity since it is then put into tension. Thus, mutually supplementary elasticity is thereby displayed, one part being put into compression while the other piece is put into tension.

Figure 6:
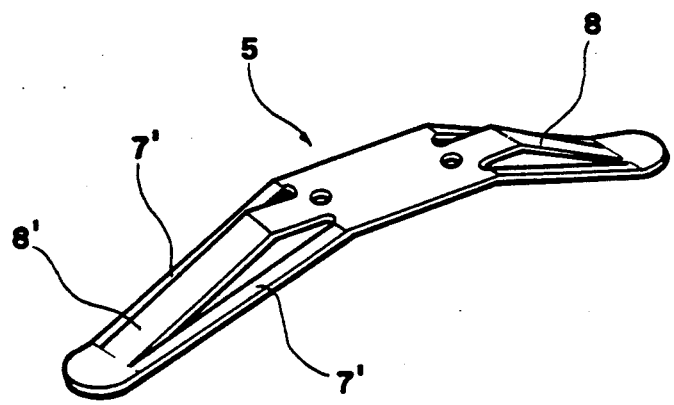
FIG. 6 is a perspective view illustrating another embodiment of the present invention.
Figure 7:
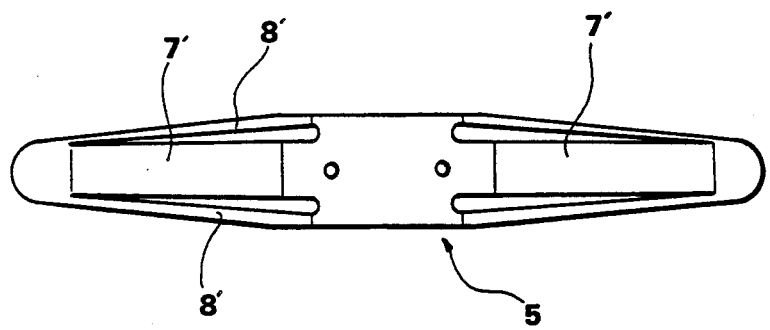
FIG. 7 is a plane view of the support spring shown in another embodiment of the present invention.
Figure 8A:
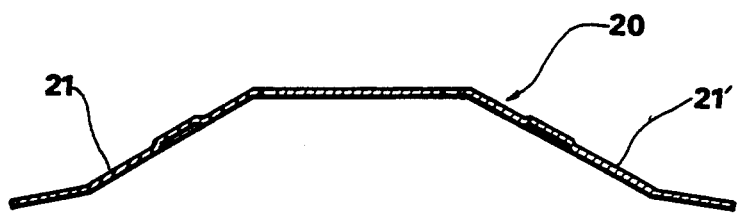
FIGS. 8A and 8B are vertical sectional views of the support spring heretofore in use.
Figure 8B:
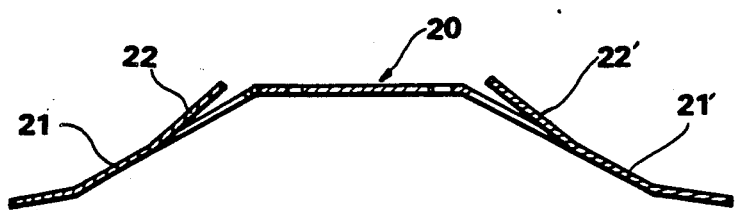

FIG. 6 is a perspective view illustrating another embodiment of the present invention and FIG. 7 is a planar schematic diagram thereof. Here a supplementary elastic piece 8' is formed on either side of a central bending part 7'. Thus the supplementary elastic piece 8' is formed on both sides of bending part 7', unlike the embodiment described with reference to FIGS. 1-3, but producing an effect by the same manner of working.

The springs of FIGS. 1-3 and 6-7 are preferably made in a single casting process and preferably using a general synthetic resin such as polycarbonate, poly acetal, epoxy, polyamide and polyethylene terephthalate.

As described hereinabove, the present invention overcomes various problems caused by the metallic support spring heretofore used by providing a support spring molded by injecting synthetic resin and reduces manufacturing work and production costs. Furthermore, it solves the lack of elastic force ascribable to synthetic resin by the united working of the elasticity of bending part itself and the elasticity of supplementary elastic piece.

What is claimed is:

1. A support spring comprising:
   (a) a generally planar central portion;
   (b) a pair or pressing parts disposed outwardly from said central portion;
   (c) elastic means coupling said pair of pressing parts with said central portion, said elastic means including at least a supplementary piece and a bending part which join each of said pressing parts at common junction line, said bending part and said supplementary piece meeting said central portion at different junctions spaced from each other such that from a common reference point in said central portion the distance between the point of joinder of said bending parts and said central portion with respect to said common reference point as compared to the distance between the point of joinder of said supplementary piece and said central portion with respect to said reference point differs, said points of joinder of said bending parts and said supplementary piece being generally parallel to and transversely spaced from each other along the longitudinal axis of said spring.

2. The spring of claim 1 wherein said bending part joins said central part at a junction disposed a greater distance from said reference point than the junction between said supplementary piece and said central portion.

3. The spring of claim 2, wherein, for each pressing part, said elastic means comprises two supplementary pieces and one bending part, the supplementary pieces being disposed on either side of said bending part.

4. The spring of claim 2, wherein, for each pressing part, said elastic means comprises one supplementary piece and two bending parts, the bending parts being disposed on either side of said supplementary piece.

5. The spring of claim 1, wherein it is formed integrally by casting from a suitable resin.

6. A support spring for use on the inside surface of the upper half of a cassette housing, the spring having pressing parts which, in use, engage and press upon reels installed in the cassette, said spring comprising:
   (a) a central portion adapted to be fixed to said inside surface;
   (b) a supplementary piece joining said central portion with said pressing parts; and
   (c) a bending part also joining said central portion with said pressing parts, said bending part being shorter than said supplementary piece, wherein in use, one of said supplementary pieces and said bending part is put into tension and the other of said supplementary pieces and bending part is put into compression.

7. The support spring of claim 6, wherein the spring is intergrally cast of a suitable resin.

8. The support spring of claim 6, wherein two supplementary pieces join said central portion with each said pressing part, said two supplementary pieces being disposed on either side of an associated bending part.

9. The support spring of claim 6, wherein two bending parts join said central portion with each of said pressing parts, said bending parts being disposed on either side of an associated supplementary piece.

10. The support spring of claim 6, wherein said central portion has a generally planar configuration and said supplementary piece and said bending part meet at a plane that is occupied by said central portion at different junctions spaced different distances from a central part of said central portion.

11. A support spring comprised of:
    a generally planar central portion having two opposing sides and a middle area joining said two opposing sides;
    supplementary pieces extending at an angle from said opposing sides, said supplementary pieces extending from said central portion along a first line;
    bending parts extending at an angle from said middle area and between said supplementary pieces, said bending parts extending from said central portion along a second line, said bending parts being generally separated from said supplementary pieces, said lines being generally parallel to each other and transverse to the longitudinal axis of said spring.

12. The spring of claim 11 wherein at an end opposite their joinder with said generally planar portion, said supplementary pieces and said bending parts form a further angle and join into a single end pressing part, said further angle being along a common line shared by said bending part and supplementary pieces, said spring being generally concave in shape.

13. The spring of claim 11 wherein along the length of said bending parts, said bending parts lie generally above said supplementary pieces.

14. The spring of claim 11 wherein along the length of said bending parts, said bending parts lie generally below said supplementary pieces.

15. The spring of claim 11 wherein said first line is parallel to and further from a central dividing line of said central portion than is said second line.

16. The spring of claim 11 wherein said second line is parallel to and further from a central dividing line of said central portion than is said first line.

* * * * *